Aug. 6, 1968 C. R. CORSON ET AL 3,396,314

OVERDRIVE CIRCUIT FOR INDUCTIVE LOADS

Filed April 13, 1965

INVENTORS
CARL RUTHEFORD CORSON &
PAUL HOFFMAN
BY John V. Regan
Attorney

United States Patent Office 3,396,314

Patented Aug. 6, 1968

3,396,314

OVERDRIVE CIRCUIT FOR INDUCTIVE LOADS

Carl R. Corson, Northridge, and Paul Hoffman, Canoga Park, Calif., assignors to Radio Corporation of America, a corporation of Delaware Filed Apr. 13, 1965, Ser. No. 447,824
3 Claims. (Cl. 317—148.5)

ABSTRACT OF THE DISCLOSURE

A transistorized solenoid driver circuit including first and second normally nonconductive transistor switches for respectively connecting first and second potentials in series with a current responsive impedance, the magnitude of the first potential being much larger than the magnitude of the second. First and second control circuits render both transistors conductive in response to an input signal having a leading and a trailing edge definitive of its duration. Means are provided to inhibit connection of the second potential to the load impedance while the first potential is connected thereto. A timing circuit is operative to render the first transistor nonconductive a predetermined time after the leading edge of the input signal. The inhibiting means ceases to operate at the predetermined time so that the second potential is connected to the load impedance for the remainder of the duration of the input signal.

Figure 1:
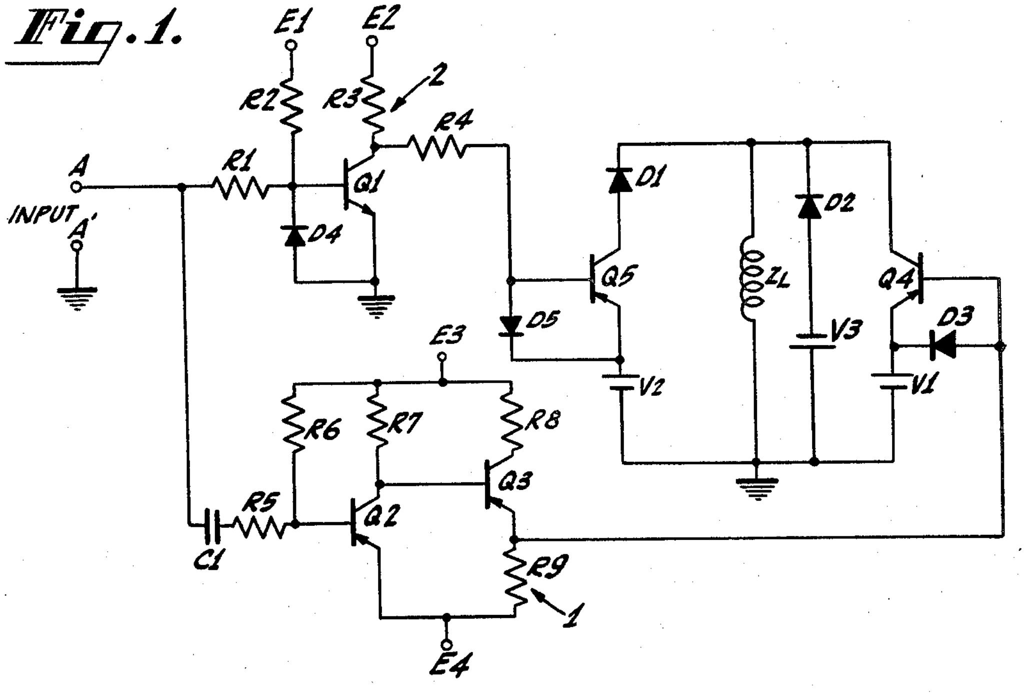

This invention relates to electronic circuitry, and more particularly to semiconductor circuitry for high speed operation of current responsive load impedances.

In general the speed of operation of a current responsive impedance is related to the amount of voltage applied to it. When high speed is not required, application of the normal operating voltage usually provides adequate speed. However, when high speed operation is required, it becomes necessary to temporarily apply large voltage overdrive for more rapid energization. A typical current responsive load impedance is a solenoid or other electromagnetic coil means. High speed actuation of solenoid operated devices is desirable, for example, when the devices are used in conjunction with an electronic data processing system.

The electrical energy available in electronic data processing systems for controlling solenoid devices is generally a logic signal which changes from one of two voltage levels to the other in step function fashion. The voltage difference between the two voltage levels is usually small, on the order of a few volts. In contrast, the voltage required to initially overdrive a solenoid for high speed actuation is much larger. Consequently, the control circuitry which drives a solenoid must be capable of switching a relatively large voltage to a solenoid in response to a relatively small voltage signal.

In some prior art solenoid switching arrangements the energy for driving the solenoid is stored during the off condition of the solenoid. This energy storage results in undesirable power dissipation during the off condition of the solenoid. Moreover, when the solenoid is required to turn on, off and back on very rapidly, the energy stored during the off condition may be insufficient to turn the solenoid on again.

It is an object of this invention to provide for high speed actuation of a solenoid operated device while minimizing power requirements.

A further object of this invention is to reduce solenoid actuate time by employing an improved circuit which generates an overdrive voltage which is several times larger than the normal solenoid operating voltage.

A still further object of this invention is to provide a solid state circuit using semiconductor switching and amplying devices for rapidly switching relatively large voltages to a solenoid.

Briefly stated, the invention provides first and second transistor switch means for respectively connecting first and second potentials in series with a current responsive impedance, the magnitude of the first potential being much larger than the magnitude of the second. Both transistors are nonconductive when the current responsive impedance is in its unactuated or off condition. Thus, power dissipation during the off condition is minimized. First and second control circuits render both transistors conductive in response to an input signal having a leading and a trailing edge definitive of its duration. Means are provided to inhibit connection of the second potential to the load impedance while the first potential is connected thereto. A timing circuit is operative to render the first transistor nonconductive a predetermined time after the leading edge of the input signal. Normally the predetermined time occurs before the trailing edge of the input signal so that the first potential is connected to the load for only a part of the duration of the input signal. The inhibiting means ceases to operate at the predetermined time so that the second potential is connected to the load impedance for the remainder of the duration of the input signal.

Figure 2:
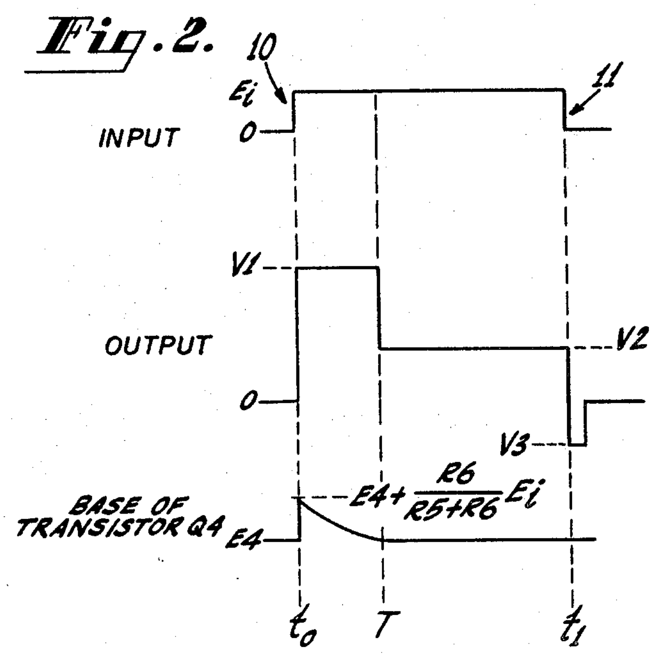

FIG. 1 is a circuit arrangement for providing high speed actuation of a solenoid; and FIG. 2 is a graph illustrating waveforms taken at various points in the circuit arrangement of FIG. 1.

Referring now to FIG. 1, first and second semiconductor switching means, illustrated as transistors Q4 and Q5, are provided to connect potentials V1 and V2 respectively in series with a load impedance $Z_L$. The load impandec $Z_L$ may be a coil or solenoid of the type associated with an electromagnet arrangement as is well known in the art. One series circuit includes the load impedance $Z_L$, potential V1 and the collector-to-emitter path of transistor Q4. A second series circuit includes the load impedance $Z_L$, potential V2, diode D1 and the collector-to-emitter path of transistor Q5. For transistors having the illustrated conductivity types, both potentials V1 and V2 have their positive terminals connected to the emitters of transistors Q4 and Q5 respectively. A reference potential may be connected to the circuit point to which one terminal of the load impedance $Z_L$ and the negative terminals of potentials V1 and V2 are connected. This reference potential may be arbitrarily considered as ground, illustrated by the conventional symbol in FIG. 1.

Transistors Q4 and Q5 are normally biased into the nonconductive or cutoff regions of their characteristics by the voltage conditions existing at the respective bases and emitters of the two transistors. The emitters of transistors Q4 and Q5 are maintained at the positive potentials V1 and V2 respectively. The bases of transistors Q4 and Q5 are normally maintained more positive than potentials V1 and V2 by control circuits 1 and 2, respectively. The normal condition is considered to be that condition which exists when no input signal is applied at input terminal A. For illustrative purposes, input terminal A is considered to be at a reference level of zero volts for this condition.

Control circuit 1 includes normally conductive transistor Q2 and normally nonconductive transistor Q3. The emitter of transistor Q2 is directly connected to a bias voltage E4; while the emitter of transistor Q3 is connected by way of resistance R9 to bias voltage E4. The collectors of transistors Q2 and Q3 are connected to bias voltage E3 by way of resistances R7 and R8, respectively. The base of transistor Q3 is directly connected to the collector of transistor Q2; while the base of transistor Q2 is connected to input terminal A by way of the series connection of resistance R5 and capacitance C1. The base of transistor Q2 is also connected to bias voltage E3 by way of resistance R6.

In the normal condition transistor Q2 is biased into the fully conductive or saturation region of its characteristic. Bias voltage E4 is more positive than bias voltage E3. With transistor Q2 saturated its base and collector are at a voltage which is substantially the magnitude of bias voltage E4. Transistor Q3 is biased into nonconduction as the bias voltage E4 is greater than potential V1 minus the voltage drop across diode D3. Bias voltage E4 is selected to be more positive than potential V1 so that transistors Q3 and Q4 are biased into the nonconductive or cutoff region of their characteristics for the normal condition. Diode D3 is connected between the base and emitter of transistor Q4 with the polarity as illustrated in order to limit the reverse bias on the base-to-emitter junction of the transistor.

In control circuit 2 the emitter of transistor Q1 is connected to the ground reference level. The base of transistor Q1 is connected by way of a resistance R1 to input terminal A and by way of a resistance R2 to a bias voltage E1. The collector of transistor Q1 is connected by way of a resistance R3 to bias voltage E2 and by way of resistance R4 to the base of transistor switch Q5.

For the normal condition transistor Q1 is biased into the cutoff or nonconductive region of its characteristic. Bias voltage E1 is more negative than the reference level at input A; while bias voltage E2 is more positive. Diodes D4 and D5 are connected between the bases and emitters of transistors Q1 and Q5, respectively, with the polarities as illustrated in order to limit the reverse bias on the base-to-emitter junction of the transistors. Bias voltage E2 is selected to be more positive than potential V2 so that transistor Q5 is biased into the nonconductive or cutoff region of its characteristic for the normal condition.

Potential V2 is selected to be equal to the normal operating voltage of the solenoid $Z_L$. Potential V1 is selected to have a value many times larger than potential V2 in order to provide a large overdrive voltage for high speed actuation of the solenoid. The amount of overdrive voltage is a function of the power capabilities of the transistor Q4 and solenoid $Z_L$.

The circuit in FIG. 1 responds to an input signal at input terminal A in such manner that both transistors Q4 and Q5 become fully conductive tending to connect potentials V1 and V2 in series with the solenoid $Z_L$. Reference is made to FIG. 2 which illustrates the waveforms at various points in the circuit of FIG. 1. The waveform labeled INPUT is applied to the input terminals A and A'. Terminal A' is connected to the ground reference level. The input signal changes from the normal reference level at a time $t_0$ to a voltage level $E_i$ as indicated at the leading edge 10. The input signal remains at the voltage level $E_i$ until time $t_1$ at which time it returns to the zero reference level as indicated by the trailing edge 11.

When input terminal A changes from the zero reference level to the voltage level $E_i$ at the leading edge of the input signal, transistor Q1 is biased into the fully conductive region of its characteristic. The base of transistor Q5 changes to a voltage which is more negative than potential V2. Transistor Q5 is forward biased into the fully conductive region of its characteristic, thereby connecting potential V2 in series with solenoid $Z_L$.

Control circuit 1 responds to the leading edge 10 of the INPUT waveform in the following manner. The voltage level $E_i$ is A.C. coupled by capacitance C1 and resistance R5 to the base of transistor Q2. The base of transistor Q2 is now more positive than its emitter. Consequently, transistor Q2 is biased into the nonconductive region of its characteristic. Since bias voltage E3 is considerably less positive than bias voltage E4, transistor Q3 is rendered fully conductive, The base of transistor Q4 changes to a less positive voltage forward biasing transistor Q4 into the fully conductive region of its characteristic, thereby connecting substantially all of the potential V1 in series with the solenoid $Z_L$.

Since the potential V1 is much larger than the potential V2, diode D1 is reverse biased. Thus, diode D1 inhibits or disconnects potential V2 from solenoid $Z_L$ whenever transistor Q4 conducts to connect potential V1 in series with solenoid $Z_L$. This connection of potential V1 in series with the solenoid is indicated in the waveform labeled OUTPUT in FIG. 2 at time $t_0$.

A timing circuit including resistances R5 and R6 and capacitance C1 is operative to cause control circuit 1 to render transistor Q4 nonconducting at a predetermined time T after the occurrence of the leading edge 10. This will normally occur before the occurrence of the trailing edge 11 of the INPUT waveform. However, the trailing edge of the INPUT waveform may occur either before or in time coincidence with predetermined time depending upon the logic of the data processing system. In either event, both control circuits 1 and 2 respond to the trailing edge to disconnect both potentials V1 and V2 from the solenoid $Z_L$. As mentioned previously, the base of transistor Q2 is at substantially the voltage E4 when input terminal A is at the reference level of zero volt. The voltage on the capacitance C1 is also at substantially the voltage E4. The waveform labeled BASE OF TRANSISTOR Q2 in FIG. 2 shows this condition prior to time $t_0$. As the INPUT waveform is applied to the terminals A and A', the voltage at the base of transistor Q2 increases from E4 to a voltage equal to $$E4 \text{ plus } \frac{R6}{R5+R6} E_i$$

Transistor Q2 cuts off at this time. Capacitance C1 begins to discharge through resistances R5 and R6 toward bias voltage E3. As capacitance C1 discharges, the voltage at the base of transistor Q2 decreases until it becomes slightly more negative than bias voltage E4 so that transistor Q2 becomes biased into a fully conductive state at the predetermined time T. At this time transistors Q3 and Q4 cut off and potential V1 is disconnected from the solenoid $Z_L$. The predetermined time T, which is determined by the values of resistances R5 and R6 and capacitance C1, is selected to be of sufficient duration for potential V1 to actuate the solenoid $Z_L$.

At the predetermined time T diode D1 becomes forward biased. Potential V2 is connected in series with solenoid $Z_L$ for the remainder of the INPUT waveform duration as indicated by the OUTPUT waveform in FIG. 2. Consequently, control circuits 1 and 2 in response to an input signal having a leading and a trailing edge control the conductivity of transistors Q4 and Q5 in such manner that solenoid $Z_L$ is rapidly energized by a large overdrive voltage V1 in a time T and is held in an energized condition by a normal operating voltage V2 until the input signal terminates.

The OUTPUT waveform tends to go negative at the turnoff time $t_1$ by an amount equal to the back EMF generated by the solenoid. In order to limit the back EMF generated by the solenoid at the turnoff time $t_1$, diode D2 and voltage V3 are connected in parallel with solenoid $Z_L$. Between the times $t_0$ and $t_1$ the potentials V2 and V1 successively applied to the solenoid coil operate to reverse bias the diode D2 to disconnect the source V3 from the solenoid.

Although the invention has been illustrated with transistors each of which has a particular conductivity type, it is apparent that each transistor can be of the opposite conductivity type so long as the diodes and bias voltages are given appropriate polarities.

What is claimed is:

1. A circuit for high speed actuation of a solenoid operated device comprising,
   - a solenoid,
   - first and second potentials, the magnitude of said first potential being larger than the magnitude of said second potential, first and second normally nonconductive transistor switch means for respectively connecting said first and second potentials in series with said solenoid, input means for generating a signal having a leading and a trailing edge definitive of its duration, first and second control means for rendering both of said transistor switch means conductive in response to said input signal, the signal across said load impedance attaining said first potential magnitude as both of said transistor switch means becomes conductive, means for coupling said input means to said first and second control means including a timing circuit for rendering said first transistor switch means nonconductive at a predetermined time after the occurrence of said leading edge and before the occurrence of said trailing edge, the signal across said load impedance changing from said first to said second potential magnitude as said first transistor switch means becomes nonconductive, and means for inhibiting the connection of said second potential in series with said load impedance until said predetermined time, said inhibiting means including a diode, said diode being connected in the series path of said solenoid, said second transistor switch means and said second potential; said diode being reverse biased during the time defined by the occurrence of said leading edge and said predetermined time and forward biased during the time following said predetermined time until said trailing edge.

2. The invention as claimed in claim 1 wherein said timing circuit includes a resistance and capacitance network.

3. An electrical circuit comprising, a load impedance, first and second potentials, the magnitude of said first potential being larger than the magnitude of said second potential, input means for generating a signal having a leading edge and a trailing edge definitive of its duration, first and second like conductivity transistors each having a base, emitter and collector, a diode having two electrodes, means for connecting the emitters of said first and second transistors to said first and second potentials, respectively, means for connecting one of said diode electrodes to the collector of said second transistor, means for coupling said load impedance in common to the other of said diode electrodes and to the collector of said first transistor, first and second control means for biasing said first and second transistors conductive in response to said input signal, the signal across said load impedance attaining said first potential magnitude as said first transistor becomes conductive, and means for coupling said input means to said first and second control means including a timing circuit for biasing said first transistor nonconductive at a predetermined time after the occurrence of said leading edge and before the occurrence of said trailing edge, the signal across said load impedance changing from said first to a second magnitude as said first transistor becomes nonconductive.

References Cited

UNITED STATES PATENTS

| | | | |
|---|---|---|---|
| 3,206,651 | 9/1965 | Proulx | 317—148.5 |
| 3,268,045 | 8/1966 | Poumakis | 192—184 |
| 3,268,776 | 8/1966 | Reed | 317—148.5 |
| 3,293,505 | 12/1966 | Miller | 317—148.5 |

LEE T. HIX, *Primary Examiner.*

J. A. SILVERMAN, *Assistant Examiner.*